(No Model.)

P. JANDER.
WATCHMAKER'S CALIPERS.

No. 533,537. Patented Feb. 5, 1895.

Witnesses:
F. L. Ourand
Bennett H. Jones

Inventor:
Paul Jander,
by Finckel & Finckel,
Attorneys.

UNITED STATES PATENT OFFICE.

PAUL JANDER, OF COLUMBUS, OHIO.

WATCHMAKER'S CALIPERS.

SPECIFICATION forming part of Letters Patent No. 533,537, dated February 5, 1895.

Application filed September 24, 1894. Serial No. 523,894. (No model.)

*To all whom it may concern:*

Be it known that I, PAUL JANDER, a citizen of the United States, residing at Columbus, in the county of Franklin and State of Ohio, have invented certain new and useful Improvements in Watchmakers' Tools; and I do hereby declare the following to be a full, clear, and exact description of the invention, such as will enable others skilled in the art to which it appertains to make and use the same.

The object of my invention is to provide an improved instrument for use in truing balance and other wheels.

My invention consists of a pair of parallelly arranged jaws containing bearings for the journals of the wheels with improved means for adjusting them toward or from each other.

Heretofore the jaws of these instruments have usually been pivoted or hinged together and when they are adjusted for different sizes of wheels the bearings move in arcs and consequently the axes of the two bearings do not always lie in the same straight line. It will readily be seen that this deviation from a straight line limits the use of the instrument to a comparatively few sizes of wheels for a reliable test because when the axes of the bearings are at an angle with the axis of the wheel they do not form nice, even, smooth bearing surfaces for the journals of the wheels. By my invention the axes of the two bearings are always maintained in the same straight line so that accurate results may be obtained for a much greater number of sizes of wheels with a single instrument.

Figure 1:
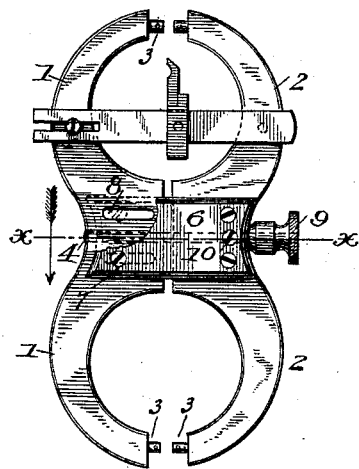
Figure 2:

In the accompanying drawings—Figure 1 is a side elevation of the instrument, and Fig. 2 is a sectional view taken on the line $x$—$x$ of Fig. 1.

The parts 1 and 2 are symmetrically formed as shown and have their outer portions curved so that their ends or jaws face each other. In these jaws are formed or secured suitable bearings 3 to receive the shaft of the wheel to be examined. To the middle portion of the part 1 is fixed a screw 4 which projects disengagedly into a hole 5 in the opposite part 2. Secured by means of screws to the opposite sides of the middle portion of the part 2 are plates 6 which extend over the middle portion of the part 1 and receive pins or screws 7 which engage parallel slots 8 in the latter and serve to keep the parts in parallel position. A nut 9 turns on the end of the screw 4 and is secured from longitudinal movement with respect to the part 2 by the end of a screw 10 which projects into a circumferential groove 11 in said nut. The operation of the nut 9 therefore causes the opening or closing of the jaws and permits the placing or removal of the wheel in the bearings 3 as well as a nice adjustment of those bearings.

What I claim is—

A device for truing balance wheels comprising the parts 1 and 2 each provided with a bearing 3 whose axes are arranged in the same straight line, parallel slots 8 in the part 1 and a screw 4 fixed in said part 1 extending into an orifice in the part 2, a nut immovable longitudinally with respect to part 2 to turn on the end of the screw, plates 6 fixed on opposite sides of the part 2 covering the slots 8 in part 1, guide pins in said plates 6 entering the slots 8, the said slots and the screw being arranged in straight lines parallel to the axes of the bearings 3 whereby the bearings are maintained and adjustable in the same straight line, substantially as described.

In testimony whereof I affix my signature in presence of two witnesses.

PAUL JANDER.

Witnesses:
GEO. M. FINCKEL,
CHAS. E. BEDWELL.